US008850389B2

(12) United States Patent
Jo et al.

(10) Patent No.: US 8,850,389 B2
(45) Date of Patent: Sep. 30, 2014

(54) APPARATUS AND METHOD FOR GENERATING APPLICATIONS AUTOMATICALLY

(75) Inventors: Young-Min Jo, Seoul (KR); Kye-Su Song, Anyang-si (KR); Eun-Hee Jung, Seongnam-si (KR)

(73) Assignee: Samsung SDS Co., Ltd., Seoul (KR)

( * ) Notice: Subject to any disclaimer, the term of this patent is extended or adjusted under 35 U.S.C. 154(b) by 348 days.

(21) Appl. No.: 13/284,402

(22) Filed: Oct. 28, 2011

(65) Prior Publication Data

US 2012/0110546 A1    May 3, 2012

(30) Foreign Application Priority Data

Oct. 28, 2010    (KR) .................. 10-2010-0106349

(51) Int. Cl.
G06F 9/44    (2006.01)

(52) U.S. Cl.
CPC ... G06F 8/71 (2013.01); G06F 8/36 (2013.01)
USPC ........................................... 717/107

(58) Field of Classification Search
CPC .................................. G06F 8/36; G06F 8/71
USPC ....................................... 717/107
See application file for complete search history.

(56) References Cited

U.S. PATENT DOCUMENTS

| 7,921,367 B2 * | 4/2011 | Rivas et al. ................... 715/746 |
| 2007/0143327 A1 * | 6/2007 | Rivas et al. ................... 707/101 |
| 2008/0307047 A1 | 12/2008 | Jowett et al. |
| 2011/0302554 A1 * | 12/2011 | Rivas et al. ................... 717/109 |

FOREIGN PATENT DOCUMENTS

| GB | 2449944 A | 12/2008 |
| JP | 2000137600 A | 5/2000 |
| JP | 2002304294 A | 10/2002 |
| JP | 2007226358 A | 9/2007 |
| KR | 1020060110886 A | 10/2006 |
| KR | 10-0656419 B1 | 12/2006 |
| KR | 1020100041574 A | 4/2010 |

* cited by examiner

Primary Examiner — John Chavis
(74) Attorney, Agent, or Firm — Sughrue Mion, PLLC

(57) ABSTRACT

Disclosed are an apparatus and method for generating applications. A plurality of source codes corresponding to functional modules of the applications are stored in the module storage unit 120. The request analysis unit analyzes a request received from a client who has requested application generation and generates a module list needed to implement functions of the applications. The application generation unit combines the source codes corresponding to the generated module list to generate a first application to be executed in a service provision system of the client and a second application to be executed in a service use system corresponding to the service provision system of the client. According to the present invention, any franchise affiliate owner or general user without application development capability can produce two mutually linked applications easily by one-time input.

7 Claims, 5 Drawing Sheets

APPARATUS AND METHOD FOR GENERATING APPLICATIONS AUTOMATICALLY

CROSS-REFERENCE TO RELATED APPLICATION

This application claims priority to Korean Patent Application No. 10-2010-0106349 filed on Oct. 28, 2010 and all the benefits accruing therefrom under 35 U.S.C. §119, the contents of which are incorporated by reference in their entirety.

BACKGROUND

The present invention relates to an apparatus and method for generating applications automatically, and more particularly to, an apparatus and method for automatically generating application programs for mobile devices.

In past, productions of a webpage, program, and application were made by experts who have relevant knowledge and experience. Recently, as programming technologies are developed, automatic software generation technologies are used widely, which enable the productions with minimum necessary information. However, in the automatic software generation technologies, even when a plurality of software applications installed in different systems for the same purpose are produced, each software application should be produced by separately inputting information needed for the software application. Accordingly, since general users should separate interconnected modules and independent modules which are needed to implement software, automatic software generation technologies are inconvenient in use.

Mobile applications are being increasingly used due to the widespread distribution of smart phones. Credit card affiliates may utilize an application for consumer distribution as a marketing tool to provide information on credit card affiliates and coupons to consumers. And also, an application for only credit card affiliates may be utilized as a tool with which sales details can be recorded and analyzed, and purchase trend of consumers can be determined. This may be a useful tool particularly to small and medium sized affiliates who do not have point of sales (POS). However, as described above, it is not easy that each store directly develops a mobile application, and this is the same when using automatic software generation technology.

There are existing simple and various services for receiving request from a small and medium sized company and then generating its webpage. One of the services is that a company for providing a shopping mall opening service provides a ready-made shopping mall with only selection of options. In this service, a service provider has already produced web program source codes used for specific functions. The service provider receives a logo and trademark which are desired by a store-owner through the ready-made program, and generates a webpage automatically. The store-owner can produce its own homepage simply with several clicks.

However, there are limitations in which only simple web pages can be implemented, and to implement various information such as sales and inventory which is capable of being implemented in a POS system, store-owners should make program development additionally. And also, store-owners can not utilize various purchase patterns of consumers who buy products in shopping malls, in marketing. In addition, store-owners should prepare for separate promotions by themselves to publicize their own shopping malls. Consumers should find out production and discount information adaptive to them through a multi-step search whenever necessary.

SUMMARY

The present disclosure provides an application generation apparatus and method which automatically generate a plurality of corresponding applications by one-time information input.

The present disclosure also provides a computer readable recording medium recording a program for executing the application generation method which automatically generates a plurality of corresponding applications by one-time information input.

According to an exemplary embodiment, an apparatus for generating applications includes: a module storage unit storing a plurality of source codes respectively corresponding to functional modules of the applications; a request analysis unit analyzing a request which is received from a client who has request generation of the applications and generating a module list needed to implement functions of the applications; and an application generation unit combining source codes corresponding to the generated module list to generate a first application to be executed in a service provision system of the client and a second application to be executed in a service use system corresponding to the service provision system of the client.

According to another exemplary embodiment, a method of generating applications includes: (a) receiving a request of a client who has requested generation of the applications from a service provision system; (b) analyzing the received request and generating a module list needed to implement functions of the applications; and (c) reading source codes corresponding to the generated module list from a module database and combining the source codes to generate a first application to be executed in the service provision system of the client and a second application to be executed in a service use system corresponding to the service provision system of the client, and wherein the module database storing a plurality of source codes corresponding to functional modules of the applications.

DETAILED DESCRIPTION OF EMBODIMENTS

Hereinafter, an apparatus and method for generating applications according to an exemplary embodiment of the present invention will be described in detail with reference to the accompanying drawings. In the description below, an application denotes software which is executed in a system or terminal including communication and information processing functions of a computer, cell phone, smart phone, and PDA. Furthermore, the application may include a web document written in a web language such as Hypertext Markup Language (HTML), Extensible Markup Language (XML), Wireless Markup Language (WML), and so forth.

Figure 1:
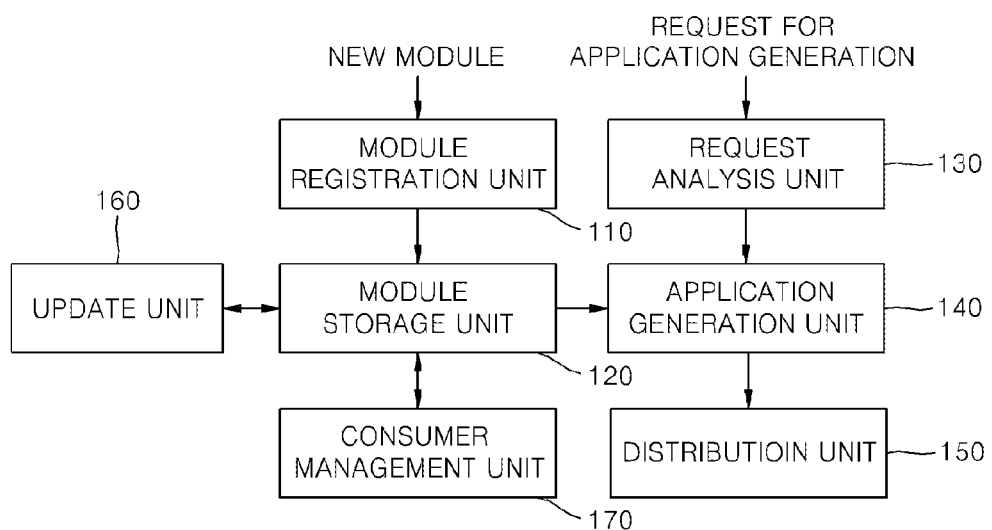
FIG. 1 is a block diagram illustrating a configuration of an apparatus for generating applications according to an exemplary embodiment of the present invention.

FIG. 1 is a block diagram illustrating a configuration of an apparatus for generating applications according to an exemplary embodiment of the present invention.

Referring to FIG. 1, an apparatus for generating applications according to the present invention includes a module registration unit 110, a module storage unit 120, a request analysis unit 130, an application generation unit 140, a distribution unit 150, an update unit 160, and a consumer registration unit 170.

The module registration unit 110 registers source codes constituting an application in an application generation apparatus according to the present invention. The application generation apparatus according to the present invention operates on the basis of well-known automatic software generation techniques. Accordingly, the source codes for generating various kinds of applications are required to be generated and registered beforehand in the application generation apparatus according to the present invention. The source codes may be written as a module template in which additional information such as a name, use, and version is recorded. The additional information such as a name, use, and version of a source code may be separately written and stored in connection with the source code. For this, the module registration unit 110 links and registers a source code input from the outside and the corresponding additional information in the module storage unit 120. Furthermore, the module registration unit 110 can check whether the input source code operates normally.

Figure 2:
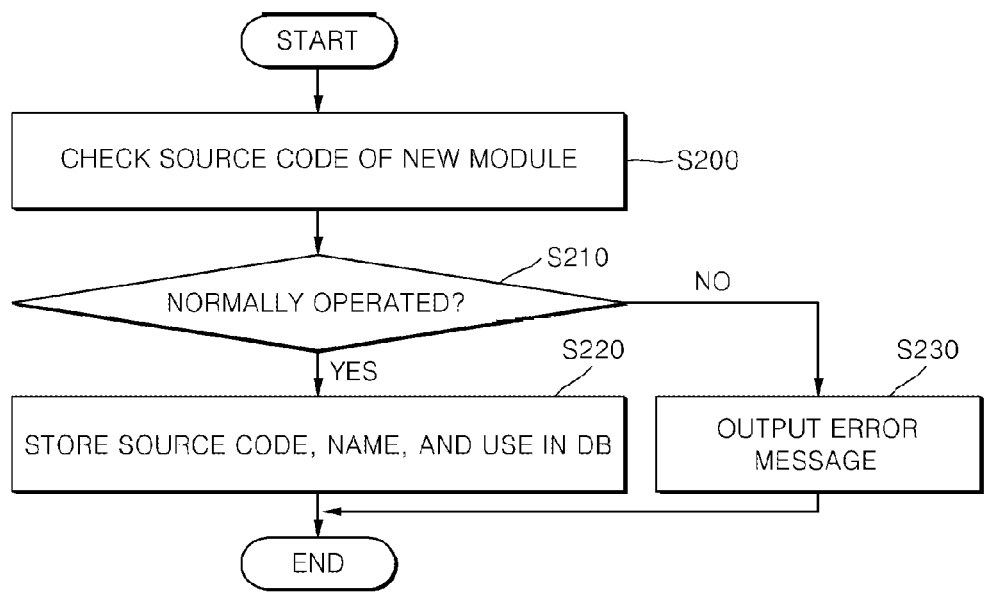
FIG. 2 is a view illustrating a process of registering a new source code input from a module registration unit.

FIG. 2 is a view illustrating a process of registering a new source code input from a module registration unit.

Referring to FIG. 2, when a source code corresponding to a new functional module is input (S200), the module registration unit 110 checks whether the source code operates normally (S210). This is a process of checking errors in grammar, declaration of variables, data input/output, and so on. Detailed descriptions of this operation will be omitted because a person skilled in the art has already well known the descriptions. If the source code operates normally, the source code and additional information corresponding thereto are stored in the module storage unit 120 (S220). Unlike this, if the source code has an error, an error message is output, and registration procedure is terminated (S230).

A plurality of source codes corresponding to functional modules of an application are stored in the module storage unit 120. In this case, the source codes are stored in the module storage unit 120 in linkage with additional information such as a name, function, use, and version.

The request analysis unit 130 analyzes a request received from a client who has requested for generating applications, and generates a module list which is necessary to implement functions of the applications. In this case, the request has detailed functions of the applications which are desired by the client. And also, the request is received from the client who has accessed the application generation apparatus according to the present invention.

Figure 3:
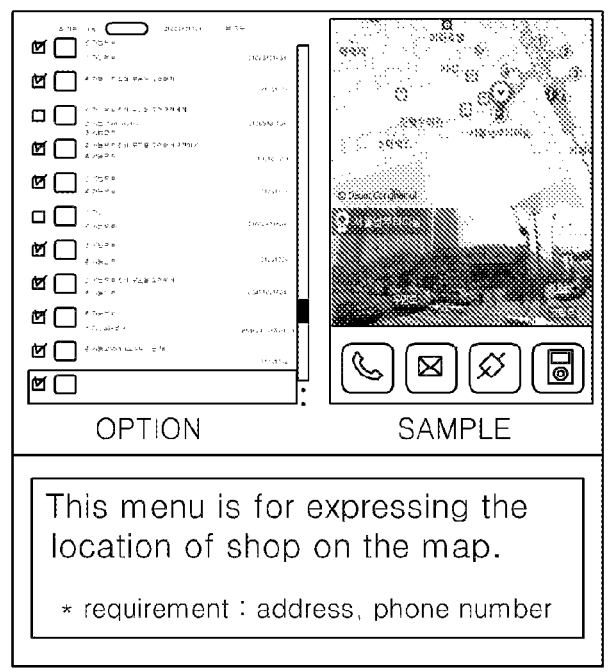
FIG. 3 is a view illustrating a user interface screen for receiving a request from a client.

FIG. 3 illustrates a user interface screen for receiving a request from a client. The user interface screen illustrated in FIG. 3 is a screen which is output to a client system in order to generate a consumer system application and client system application if the client is a credit card affiliate or a franchise affiliate.

Referring to FIG. 3, first, the client accesses the application generation apparatus according to the present invention and selects an "application generation menu". Next, the client selects desired functions and options in a selection item on the user interface screen which are output to his/her system, and requests application generation. In this case, the functions and the options of the application to be installed in the consumer system may be mobile payment, coupon or point card management, purchase recommendation, location search, store search, and so on. The functions and the options of the application to be installed in the client system may be sales report management, user statistic, point card management, application production history, and so on. The request may be received from the client through an application for requesting application generation installed in the client system. Even in this case, a user interface screen output to the client's system may be configured with the same as shown in FIG. 3.

The request analysis unit 130 generates a first module list which corresponds to requirements for functions to be implemented in the client system application and a second module list which corresponds to requirements for functions to be implemented in the consumer system application. In this case, the request analysis unit 130 generates the first module list and the second module list with reference to module templates or additional information of functional source codes. As an example, if the request of the client is "coupon publication" and "payment", the request analysis unit 130 generates the first module list including an interface module, communication module, and information collection module and the second module list including an interface module, communication module, data connection module, and payment connection module. In this case, the modules are all suitable for "coupon publication" and "payment". For example, the interface module of the first module list is for providing a user interface screen including information regarding the number of coupon publications and payment status, and the interface module of the second module list is for providing a user interface screen such as a screen for coupon sort output and a screen for payment which are provided to the consumer system depending on the consumer's selection.

The application generation unit 140 combines source codes corresponding to the module list generated by the request analysis unit 130 to generate the client system application which is operated in the client system and the consumer system application which is operated in the consumer system. In this case, the application generation unit 140 reads source codes corresponding to functional modules of the applications, which are included in the first module list and the second module list, from the module storage unit 120 and combines the source codes to generate the client system application and the consumer system application. The operation of the application generation unit 140 is described in detail below.

First, the application generation unit 140 combines module templates, information (in coupon publication, for example, store name, store location, discount rate, valid date, publication number) received from the client, and data or module connection information (connection with external payment module in a payment module and acquirement of location information from a GPS module in a cell phone in a store location search) stored in the module storage unit 120 to generate final modules corresponding to the functions. Likewise, the modules are combined by filling a module template with information provided by a user and external data. As an example, a screen for providing coupons has a configuration with a module template. Information such as a discount rate of the discount coupon is filled in the module template on the basis of user request information. Next, the application generation unit 140 integrates final modules to generate the applications. That is, when the client requests functions of "coupon publication" and "payment", the application generation unit 140 integrates final modules corresponding to the functions to generate the client system application and the consumer system application. In this case, the generated applications may be a HTML document, XML document, WML document and a web based application. Alternatively, at least one of the generated applications may be an application based on a specific platform (i.e., Android).

The distribution unit 150 provides the client system application and the consumer system application to the client system and the consumer system, respectively. In this case, the distribution unit 150 provides the client system application to the client system as a web document or an application program which is executed in the platform of the consumer system. In association with the distribution operation of the applications, the client system application may be provided to the client system immediately after generated, while the consumer system application may be provided to the consumer system upon a consumer request.

The update unit 160 performs two different update operations. One is an update operation registered in the module storage unit 120, and the other is an update operation of a written application. For the update operation of the source codes, when an update request such as function change, error correction, and function expansion of existing source codes, is input, the update unit 160 changes the existing source codes to new source codes, and simultaneously updates additional information linked with the existing source codes. Furthermore, the update unit 160 updates the written application including the source codes updated on the basis of an application generation history stored in the module storage unit 120. The update unit 160 updates the corresponding applications of the client system and the consumer system, or notifies and induces the update of the applications.

The update operation of the applications differs from the application update by the source codes with respect to a start point and content of the update. That is, the application update is made when the client requests the function expansion of the application, the changes of data, and so on. For example, if the client desires to change the discount rate of the coupon from 10% to 15%, the update unit 160 changes data in the existing applications to new input data. The data change function may be included in a certain module constituting the applications when the applications are generated. In this case, data change is not performed by the update unit 160. When the client registers data to be changed in the application generation apparatus according to the present invention, using her/his system, and the consumer system application installed in the consumer system is executed to perform data connection operation, new registered data is provided from the application generation apparatus, thereby performing the data change. When the client requests the function expansion of the applications, the update unit 160 regenerates the applications on the basis of a module or modules corresponding to a newly requested function and provides the updated applications to the client system and the consumer system. The application change due to the module change is the same operation as generating new applications, or is an operation of newly replacing only modules which are changed together with modules changed in the existing applications.

The consumer management unit 170 provides contents corresponding to service information to the consumer system with response to a request for service provision including desired service information and user identification information which are received from the consumer system. The function of the consumer management unit 170 will be described in detail, considering that the consumer system is a smart phone, the consumer system application is a movie reservation application, and the consumer executes the consumer system application installed in his/her smart phone to reserve a movie. In this case, the application executed in the consumer's smart phone transmits service information including a movie title selected by the consumer and user identification information, such as location information, a smart phone number, and so on, to a separate content provision server (access path thereto is included in the application) or the application generation apparatus according to the present invention to request the provision of contents, Next, the separate content provision server or the application generation apparatus according to the present invention searches the theater closest to the position of the consumer on the basis of received location information and provides information including the location of the theater and the running time of the movie selected by the consumer, to a smart phone of the consumer.

The consumer management unit 170 may provide use pattern of the consumer to the client system. For this, when receiving a request for service provision including desired service information and user identification information from the consumer system, the consumer management unit 170 records history information such as service information and user identification information in a service use history information database, generates a consumer use pattern on the basis of the user identification information and service information, and provides the consumer use pattern to the client system. The module storage unit 120 is used as the service history information database. Unlike this, the service history information database may be implemented separately from the module storage unit 120. The consumer use pattern includes information on purchase history and behavior information in the consumer system application. Since providing the consumer use pattern is similar to a function provided in Point on Sales (POS), in particular, the consumer use pattern can be utilized in small and medium stores without POS. Furthermore, on the basis of the consumer use pattern, the client may plan an event or change the configuration of the consumer system application.

And also, the consumer management unit 170 may provide service for analyzing the same line of business using the client system application, in addition to the consumer use pattern. Considering coffee shops as an example, the client system application of coffee shop (B) provides the term and the amount of discount in coffee shop (A) as an additional menu. To provide this service, first, whether the client agrees with information sharing should be checked. And also, the business field of the client should be stored in advance. When the client requests an application update for event items, the information of the client may be updated in other client's system applications of the same business field.

The consumer may download the consumer application through various distribution channels such as a web server, application market, and so on. Since the consumer system application is basically a web application, the consumer system application which is downloaded in the consumer system has a "shortcut" form. The "shortcut" form provides greater convenience in use to consumers because the consumers can access favorite on-line markets by one click. And also, due to the "shortcut" form, a behavior pattern of the consumer application may be recorded easily. The consumer management unit 170 collects the behavior pattern of the consumer, and on basis of this, generates and provides the consumer use pattern.

When a consumer makes payment using the consumer system application, the application is connected to an external mobile payment platform, and this platform requests corresponding Credit Card Company to approve the payment. This payment information is also collected by the consumer management unit 170 and stored in a separate database. Accordingly, the consumer information collected by the consumer management unit 170 contains behavior information and purchase history information of the consumers using the consumer system applications.

The application generation apparatus according to the present invention as described in detail above may function as an application for information management of a franchise affiliate (hereinafter called "affiliate application"), an application provided to consumers (hereinafter called "consumer application"), and a platform enabling automatic update of the applications. The application generation apparatus according to the present invention is characterized in that the application is classified into the affiliate application and the consumer application. For example, considering coupon publication, coupons are displayed in the consumer system application, while information on the publication history, publication number, and use number of coupons is output in the affiliate application. And also, QR code in addition to the affiliate application may be generated. In this case, an IP address, from which store information for advertisement or promotion may be provided as the QR code.

A method of generating applications according to an exemplary embodiment of the present invention will be described below with an example of an affiliate and consumer.

Figure 4:
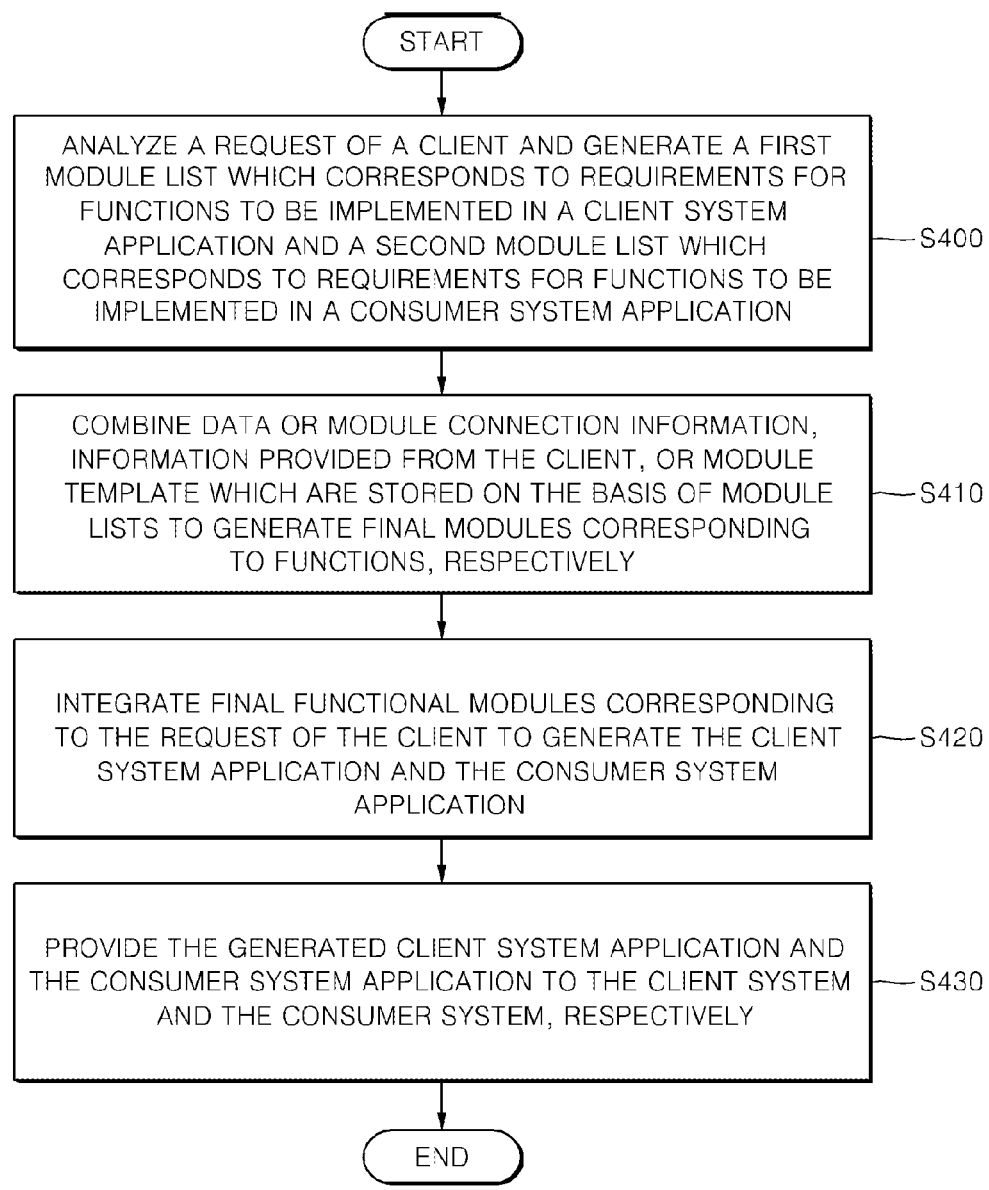
FIG. 4 is a flow chart showing a method of generating applications according to an exemplary embodiment of the present invention.

FIG. 4 is a flow chart illustrating a method of generating applications according to an exemplary embodiment of the present invention.

Referring to FIG. 4, when a request input by a client is received from a client system, the request analysis unit 130 generates a first module list which corresponds to requirements for functions to be implemented in the client system application and a second module list which corresponds to requirements for functions to be implemented in the consumer system application (S400). For this, the module storage unit 120 contains modules for main functions required by a consumer or the client. For example, if the client system is POS of a credit card or franchise affiliate, the client system application may have functions such as sale record management, user statistics, point card management, and application history which are needed to an affiliate, while the consumer system application may have functions such as mobile payment, coupon, point card, recommendation (for purchase), location, search, menu, and store search which are useful to a consumer's need.

The application generation unit 140 combines data or module connection information, information provided from the client, or module template which are stored in the module storage unit 120 on the basis of the module list generated by the request analysis unit 130 to generate final modules corresponding to functions requested by the client, respectively (S410). In this case, the final modules are generated for the client system application and the consumer system application according to functions requested by the client, respectively. Next, the application generation unit 140 integrates the final modules corresponding to the request of the client to generate the client system application and the consumer system application (S420). The distribution unit 150 provides the client system application and the consumer system application to the client system and the consumer system, respectively (S430). In this case, the consumer system application is distributed in the form of an application for an OS which is used in mobile devices such as a smart phone, tablet PC, and notebook PC, or a web based application applying web technology such as HTML5. The client system application can be executed in all the devices capable of being connected to the Internet, which are not limited to a specific device such as POS, smart phone, tablet PC, notebook PC, desktop PC, and so on.

The applications are installed in the client system and the consumer system, and then the update of a source code and an application, collection of consumer information, provision of contents corresponding to a request of the consumer, generation of consumer user patterns, and provision of the consumer user patterns to the client system are performed.

Figure 5:
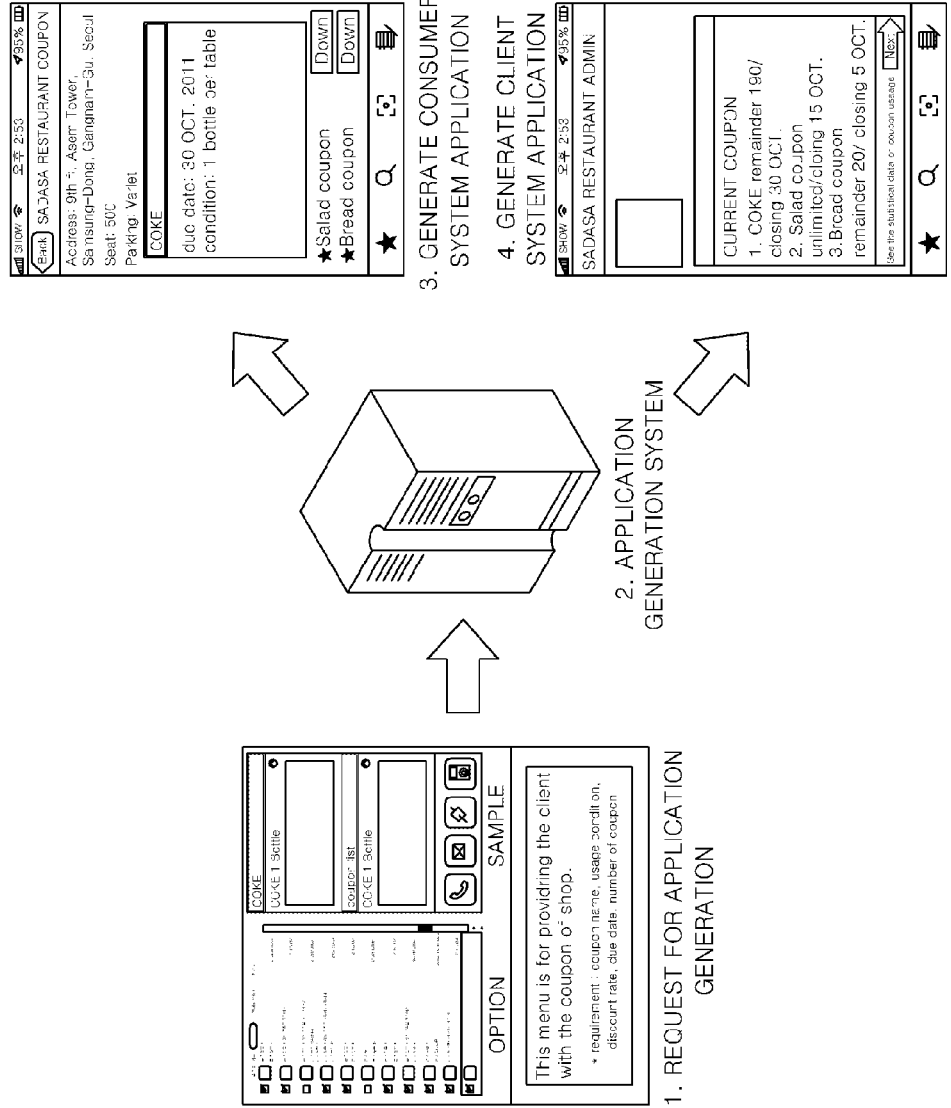
FIG. 5 is a view illustrating a user interface screen which is output to a client system in the process of generating applications by the present invention and a user interface which is output by executing a consumer system application installed in a consumer system.

FIG. 5 is a view illustrating a user interface screen which is output to the client system in the operation of generating the application by the present invention and a user interface which is output by executing the consumer system application installed in the consumer system.

Referring to FIG. 5, the client (for example, an affiliate owner) specifies functions needed to the applications which are desired to be produced using the user interface screen output to his/her system. The request of the client is transmitted to the apparatus for generating applications according to the present invention. The apparatus for generating applications according to the present invention generates and provides the client system application and the consumer system application using the methods described above. When the client and the consumer execute the corresponding application in his/her systems, user interface screens as shown in the right side of FIG. 5 are output to each system, respectively.

Figure 6:
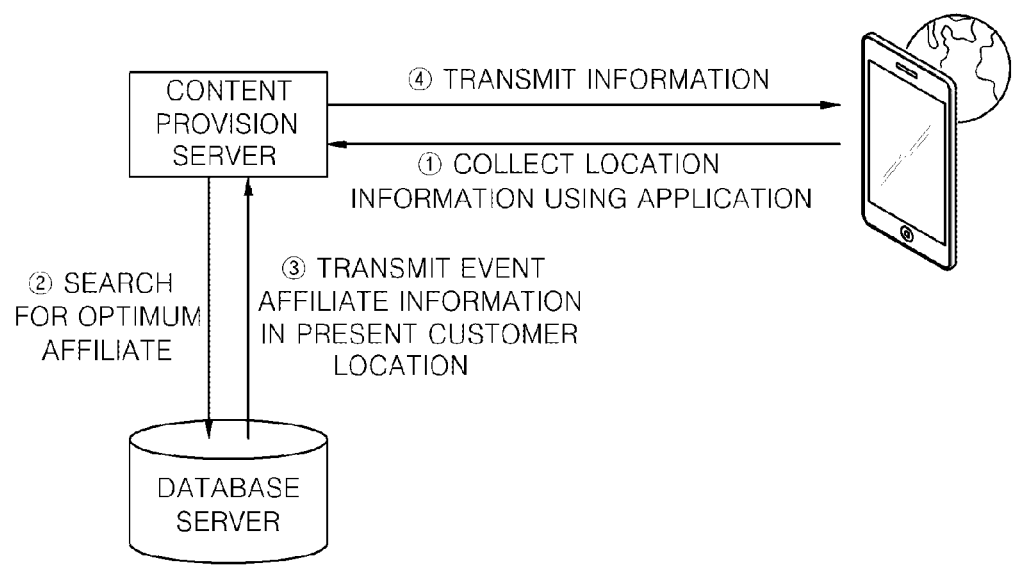
FIG. 6 is a view illustrating a process of providing a service requested by a consumer, using the consumer system application generated by the present invention.

FIG. 6 is a view illustrating a process of providing a service requested by a consumer, using the consumer system application generated by the present invention.

Referring to FIG. 6, when a consumer executes the consumer system application installed in his/her system and requests search for affiliates which provide events, the consumer system application transmits location information of the consumer and the request of the consumer to a content provision server (that is the apparatus for generating applications according to the present invention or an separate content provision server) (①). The content provision server requests search for the affiliate closest to the consumer location among affiliates providing an event, to a database server (②). The database server provides optimum affiliate information including location information and event information to the content server with response to the request of the content server (③). Lastly, the content provision server transmits the optimum affiliate information to the consumer system.

In the above description, the system in which one of the two corresponding applications is mainly called as a client system and consumer system, but the client system may be called as an affiliate system and service provision system, and the consumer system may be called as service use system. In addition, the client application and consumer application may be called as the first application or affiliate application and the second application, respectively.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The present invention has been particularly shown and described with reference to preferred embodiments thereof. The invention should not be construed as being limited to the embodiments set forth herein. It will be understood by a person skilled in the art that various changes in form and details may be made therein without departing from the spirit and scope of the present invention as defined by the following claims.

The application generation apparatus and method according to the present invention can generate a plurality of corresponding applications automatically by one-time information input. And also, any franchise affiliate owner or general user who has no application development capability can produce two mutually linked applications easily by one-time input. Furthermore, applying the present invention to the production of affiliate and consumer applications, the affiliate can utilize the application as a tool of sales management and target marketing since the affiliate receives consumer use information even when the affiliate does not have POS. Using the consumer application, the affiliate can secure marketing channel, and consumers can receive information on desired affiliates easily.

What is claimed is:

1. An apparatus for generating applications, the apparatus comprising:
   a module storage unit configured to store a plurality of source codes respectively corresponding to functional modules of the applications;
   a request analysis unit configured to analyze a request for generation of the applications received from a client device and to generate a first module list listing modules needed to implement functions of a service provision system and a second module list listing modules needed to implement functions of a service use system corresponding to the service provision system; and
   an application generation unit configured to combine first source codes corresponding to the modules listed in the first module list to generate a first application to be executed in the service provision system and to combine second source codes corresponding to the modules in the second module list to generate a second application to be executed in the service use system.

2. The apparatus of claim 1, further comprising a distribution unit configured to provide the first application and the second application to the service provision system and the service use system, respectively.

3. The apparatus of claim 2, wherein the distribution unit is configured to provide the second application to the service use system as a web document or an application program, the application program being executed in a platform of the service use system.

4. A method of generating applications, the method comprising:
   (a) receiving a request for generation of the applications from a client device;
   (b) analyzing the received request and generating a first module list listing modules needed to implement functions of a service provision system and a second module list listing modules needed to implement functions of a service use system corresponding to the service provision system; and
   (c) reading first source codes corresponding to the modules listed in the first module list and second source codes corresponding to the modules listed in the second module list from a module database and combining the first source codes to generate a first application to be executed in the service provision system and the second source codes to generate a second application to be executed in the service use system, and
   wherein the module database storing a plurality of source codes respectively corresponding to functional modules of the applications.

5. The method of claim 4, further comprising:
   (d) providing the first application and the second application to the service provision system and the service use system, respectively.

6. The method of claim 5, wherein, in step (d), the second application is provided to the service use system as a web document or an application program, the application program being executed in a platform of the service use system.

7. A non-transitory computer readable recording medium recording a program for executing the method of generating an application according to claim 4.

* * * * *